United States Patent
McNally et al.

(10) Patent No.: US 7,256,974 B2
(45) Date of Patent: Aug. 14, 2007

(54) ELECTRICAL GROUND ISOLATION AND SECONDARY FAILURE REDUCTION DETECTION AND ISOLATION

(75) Inventors: Christopher Wade McNally, Girard, PA (US); Ajith K. Kumar, Erie, PA (US); Bret Dwayne Worden, Union City, PA (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 11/401,664

(22) Filed: Apr. 11, 2006

(65) Prior Publication Data
US 2006/0181821 A1    Aug. 17, 2006

Related U.S. Application Data

(62) Division of application No. 10/115,859, filed on Apr. 2, 2002, now Pat. No. 7,035,065.

(51) Int. Cl.
*G01R 27/18* (2006.01)
*G01R 27/20* (2006.01)

(52) U.S. Cl. .................. 361/42; 324/654; 324/509; 714/25

(58) Field of Classification Search .......... 361/42; 324/654, 509; 714/25
See application file for complete search history.

(56) References Cited

U.S. PATENT DOCUMENTS

| | | | |
|---|---|---|---|
| 4,541,031 A | 9/1985 | Ibbetson | |
| 4,827,369 A | 5/1989 | Saletta et al. | |
| 5,160,926 A | 11/1992 | Schweitzer, III | |
| 5,282,212 A | 1/1994 | Shah | |
| 5,309,109 A | 5/1994 | Miyazaki et al. | |
| 5,508,872 A | 4/1996 | Khoo et al. | |
| 5,517,093 A * | 5/1996 | Augustyniak et al. | 318/63 |
| 5,528,445 A * | 6/1996 | Cooke et al. | 361/20 |
| 5,561,380 A | 10/1996 | Sway-Tin et al. | |
| 5,710,777 A | 1/1998 | Gawne | |
| 5,768,079 A | 6/1998 | Buell | |
| 5,872,457 A | 2/1999 | Williams | |
| 5,877,926 A | 3/1999 | Moisin | |
| 5,945,802 A | 8/1999 | Konrad et al. | |
| 5,946,172 A | 8/1999 | Hansson et al. | |
| 5,990,686 A | 11/1999 | Vokey et al. | |
| 6,002,563 A | 12/1999 | Esakoff et al. | |
| 6,049,143 A | 4/2000 | Simpson et al. | |
| 6,081,122 A | 6/2000 | McCary | |
| 6,318,160 B1 | 11/2001 | Bessler | |
| 6,347,025 B1 | 2/2002 | Ulrich et al. | |
| 6,497,182 B2 | 12/2002 | Melpolder et al. | |

* cited by examiner

*Primary Examiner*—Michael Sherry
*Assistant Examiner*—Zeev Kitov
(74) *Attorney, Agent, or Firm*—Carlos Luis Hanze, Esq.; Terry M. Sanks, Esq.; Beusse Wolter Sanks Mora & Maire, P.A.

(57) ABSTRACT

A system for isolating electrical ground faults and secondary failures in an electrical system, the system comprising an AC ground isolation state machine for detecting and isolating an AC ground, a DC ground isolation state machine for detecting and isolating a DC ground, a component failure isolation state machine for detecting and isolating a change in a resistance, and a component failure early detection algorithm for determining a failure before using the state machines.

8 Claims, 21 Drawing Sheets

Logic for grid_box[n]_failure_detected

[A and B and {((((C and D) or E) and F) or G)] or [H and B and {((C and J) or E} and L]

| Label | Condition | Description |
|---|---|---|
| A | grid_boxes_actual = MAX_GRID_BOXES | All grid boxes are in use. |
| B | max(grid_blwr_spd[all n] > GRID_FAIL_MIN_BLWR_SPD AND dyn_brk_grid_pwr_filt > GRID_FAIL_MIN_POWER AND grid_blwr_spd_qb[all n] = Q_GOOD | At least one blower is going above the minimum speed required for failure with all qualities good, and there is minimum power. |
| C | main_sv = BRAKE AND link_volt_avg > GRID_FAIL_MIN_LINK_VOLTS AND ta_rectifier_bias_state = REVERSED | The unit is in braking, link voltage is above minimum voltage, and the traction alternator rectifier is reversed biased. |
| D | grid_ohms_ratio < DB_MAX_BOXES_R_MIN OR grid_ohms_ratio > DB_MAX_BOXES_R_MAX | The ratio of grid resistance is outside standard tolerance levels. |
| E | grid_ohms_ratio < DB_WORST_CASE_R_MIN OR grid_ohms_ratio > DB_WORST_CASE_R_MAX | The ratio of grid resistance is outside worst case tolerance levels. |

FIG. 14B

| | | |
|---|---|---|
| F | (grid_blwr_spd[n]/median(grid_blwr_spd[all n])) < MAX_BOXES_BLWR_SPD_DIFF_MIN<br>OR<br>(grid_blwr_spd[n]/median(grid_blwr_spd[all n])) > MAX_BOXES_BLWR_SPD_DIFF_MAX | The ratio of this grid blower speed to the average of the other two blower speeds is outside standard tolerance levels. — 330 |
| G | (grid_blwr_spd[n]/median(grid_blwr_spd[all n])) < WORST_CASE_BLWR_SPD_DIFF_MIN<br>OR<br>(grid_blwr_spd[n]/median(grid_blwr_spd[all n])) > WORST_CASE_BLWR_SPD_DIFF_MAX | The ratio of grid blower speed to the average of the other two blower speeds is outside worst case tolerance levels. — 332 |
| H | grid_boxes_actual < MAX_GRID_BOXES<br>AND<br>ta_rectifier_bias_state = REVERSED | Not all grid boxes are in use and the traction alternator rectifier is reversed biased. — 334 |
| J | grid_ohms_ratio < DB_LT_MAX_BOXES_R_MIN<br>OR<br>grid_ohms_ratio > DB_LT_MAX_BOXES_R_MIN | The ratio of grid resistance is outside standard tolerance levels. — 336 |
| L | (grid_blwr_spd[n]/grid_blwr_spd_model) < MODEL_BLWR_SPD_DIFF_MIN<br>OR<br>(grid_blwr_spd[n]/grid_blwr_spd_model) > MODEL_BLWR_SPD_DIFF_MAX | The ratio of this grid blower speed to the modeled blower speed is outside standard tolerance levels. — 338 |

AC ground isolation process with motor 2 grounded:

Dynamic Braking Grid Failure
Isolation Process with Grid Box 3 Failed

ELECTRICAL GROUND ISOLATION AND SECONDARY FAILURE REDUCTION DETECTION AND ISOLATION

CROSS REFERENCE TO RELATED APPLICATIONS

This application is a divisional of and claims the benefit of the Apr. 2, 2002 filing date of U.S. patent application Ser. No. 10/115,859, which is incorporated herein in its entirety.

FIELD OF THE INVENTION

This invention relates to electrical systems and more particularly to an apparatus and method for isolating electrical ground and secondary failures in electrical systems.

BACKGROUND OF THE INVENTION

Electrical systems may sometimes encounter faults, such as AC grounds, DC grounds or impedances outside of acceptable ranges. When such faults occur, they may mildly or seriously damage the electrical system. Electrical systems are used in a vast variety of machines or components.

One such apparatus, which uses a variety of electrical systems is a locomotive. A locomotive has a plurality of electrical systems on it. One such electrical system on a locomotive is a propulsion system. For example, a conventional diesel electric locomotive generally has a prime mover, typically a turbo-charged diesel engine with cylinders ranging from twelve to sixteen, to drive an electrical transmission. The electrical transmission generally comprises a synchronous generator that supplies electric current to a plurality of alternating current (AC) traction motors whose rotor are drivingly coupled through speed reducing gearing to respective axle wheel sets of the locomotive.

In one version, these locomotives will have an individual inverter connected to an individual traction motor while in other versions there may be multiple traction motors connected to a single inventor. The number of combinations of inverters/traction motors on a locomotive may vary from also, such as from three to six, depending of the type or style of locomotive. The inverters and traction motors are used for propulsion and braking. Again, depending on the type of locomotive, there can be a plurality of parallel paths of dynamic braking grids or grid boxes, such as ranging from three to six parallel paths of dynamic braking grids. Each grid box can be either a series or parallel combination of resistances. The generator typically comprises a main three-phase traction alternator. When excitation current is supplied to field windings on the rotating rotor, alternating voltages are generated in three-phase armature windings on the stator of the alternator. These voltages are rectified to produce a controlled amplitude DC voltage and then applied to one or more of the inverters which control the effective frequency of alternating current to be supplied to the armature windings of the traction motors.

During dynamic braking, power comes from the traction motors. If there is not enough power from the traction motors, additional power is supplied from the alternator to the brakes. At low speeds, when there is not enough power from the traction motors, most of the power is provided from the alternator during braking.

While in operation, electrical grounds, either an AC ground or DC ground may develop in the propulsion circuit. An AC ground is a ground where the voltage has a typically or predominantly AC component with respect to the grounding point. A DC ground is a ground where the voltage has a typically or predominantly DC component with respect to the ground. Thus as an illustration, in a DC locomotive, a grounding point is typically a neutral side of an alternator. If the grounding point is the neutral of the alternator and if a ground on a DC bus exists, the ground may appear as an AC ground.

If not detected in time, this problem can severally damage components of the propulsion system. Additionally resistance changes could occur which could also damage components of the propulsion system. Resistance changes occur because of either a short or an open circuit in a resistance. An open circuit in a portion of a resistor or a short circuit in a portion of a resistor, which would change the resistance could damage components. Either certain components or the rest of the circuit may encounter a high power density reading or higher temperatures, thus damaging the electrical system.

Even though systems and techniques may exist today to effectively handle these problems, they do not necessarily apply less total power, less time in power, and less power for any potentially failed components, thus minimizing a locomotive's exposure to a failure. In combination, they do not necessarily minimize the locomotive's exposure to tractive efforts. Furthermore, they do not all provide for a confirmation process to ensure isolation accuracy of failed components. They also do not provide for an early failure detection and handling based on specific operation information, which may include comparison between similar devices.

BRIEF DESCRIPTION OF THE INVENTION

Towards this end, this invention discloses a method for isolating AC electrical ground faults in an electrical system comprising isolating a component causing said AC ground, verifying said component causing said AC ground is actually causing said ground and isolating said component causing said ground. This invention also discloses a method for isolating a DC electrical ground fault in an electrical system comprising detecting a DC ground, isolating a suspected component, verifying said isolated component is causing said DC ground, and if said component is not verified as causing said DC ground, considering other sources causing said ground. Another disclosed part of this invention is a method for isolating a DC electrical fault in an electrical system comprising isolating a suspected component when a change in resistance is detected and verifying said isolated component is causing said change in resistance. A method for detecting an early failure in a component in an electrical system is also disclosed. This method comprises providing a model of operational conditions, collecting actual operational conditions, and comparing said model of operational conditions with said actual operational conditions to determine when said failure occurs.

This invention also discloses system for isolating AC electrical ground faults in an electrical system. The system comprises a plurality of components, a first state where said system waits until an AC ground is detected, a second state to isolate a component causing said AC ground, a third state to verify component causing said AC ground is actually causing said ground, a fourth state to isolate said component causing said ground, and a fifth state to enable said component after a specific period. A system for isolating DC electrical ground faults in an electrical system is also disclosed. This system comprises a plurality of components, a first state where said system waits until a DC ground is detected, a second state where said systems transitions when a DC ground is detected to isolate a suspected component, a third state to verify said suspected component isolated is causing said DC ground, and a fourth state to consider other sources if a suspected component is not identified as causing said DC ground.

A system for isolating a change in resistance in an electrical system is also disclosed. This system comprises a plurality of components a first state where said system waits until a change in resistance is detected, a second state where said systems transitions when a change in resistance is detected to isolate a suspected component, and a third state to verify said suspected component isolated is causing said change in resistance. Finally, a system for detecting an early failure in a component in an electrical system is disclosed. The system comprises a model of operational conditions specific to said component, a collection of actual operational conditions from said component, and a processor to compare said model of operational conditions with said collection of actual operational conditions to determine when said failure occurs.

BRIEF DESCRIPTION OF THE DRAWINGS

The features and advantages of the present invention will become apparent from the following detailed description of the invention when read with the accompanying drawings in which:

FIG. 14 is an exemplary chart illustrating conditions and descriptions for a Dynamic Braking Grid Failure Early Detection system;

DETAILED DESCRIPTION OF THE INVENTION

With reference to the figures, exemplary embodiments of the invention will now be described. The scope of the invention disclosed is applicable to a plurality of electrical systems, which could have a fault caused by an AC ground, DC ground, or resistance change or failure. Thus, even though this invention is disclosed specific to a propulsion electrical system on a locomotive, this invention is applicable to other locomotive electrical systems as well as other electrical systems in general.

Figure 1:
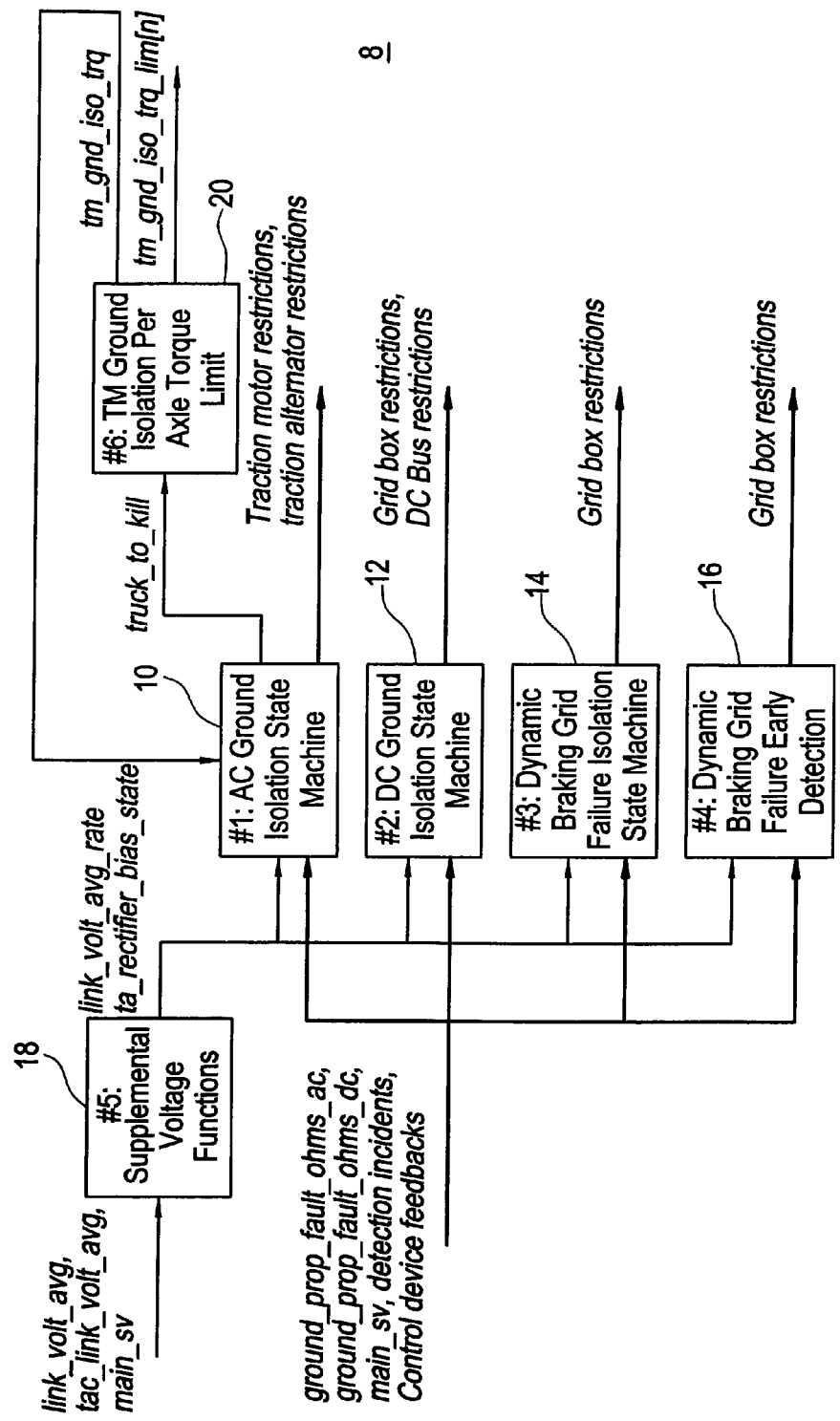
FIG. 1 is an exemplary block diagram of state machines that comprise an electrical ground isolation and secondary failure reduction system.

FIG. 1 is an exemplary embodiment of a block diagram of state machines that may comprise an electrical ground isolation and secondary failure reduction system. The electrical ground isolation and secondary failure reduction system may comprise an AC ground isolation state machine 10, a DC ground isolation state machine 12, a dynamic braking grid failure isolation state machine 14, a dynamic braking grid failure early detection algorithm 16, a supplemental voltage functions system 18, and a traction motor ground isolation per axle torque limit system 20. As illustrated, results from the supplemental voltage functions system 18 may be used in the AC ground isolation state machine 10, the DC ground isolation state machine 12, the dynamic braking grid failure isolation state machine 14, and the dynamic braking grid failure early detection algorithm 16. The results from the AC ground isolation state machine 10 are used in the traction motor ground isolation per axle torque limit system 20, where the resulting information is then fed back into the AC ground isolation state machine 10.

As is further illustrated in FIG. 1, the AC ground isolation state machine 10, the DC ground isolation state machine 12, the dynamic braking grid failure isolation state machine 14, and the dynamic braking grid failure early detection algorithm 16 are activated when either ground propulsion faults, operating state of the locomotive (i.e., motoring, braking, self-powered, idling, powered or not powered), detection incidents, and/or control device feedbacks are detected and relayed to the system 8. More specifically, the system 8 operates in three modes while a locomotive is under a powered mode. The AC ground isolation state machine 10, illustrated in FIGS. 3-5, will investigate AC grounds detected. The DC ground isolation state machine 12, illustrated in FIGS. 6-9, will investigate DC grounds detected. The dynamic braking grid failure isolation state machine 14, illustrated in FIGS. 10-13, will investigate changes in the resistance grid. The dynamic braking grid failure early detection algorithm 16, illustrated in FIG. 14, will investigate changes in blower speed coupled with resistance changes in order to get an immediate detection that a problem is occurring in the circuit.

Figure 15:
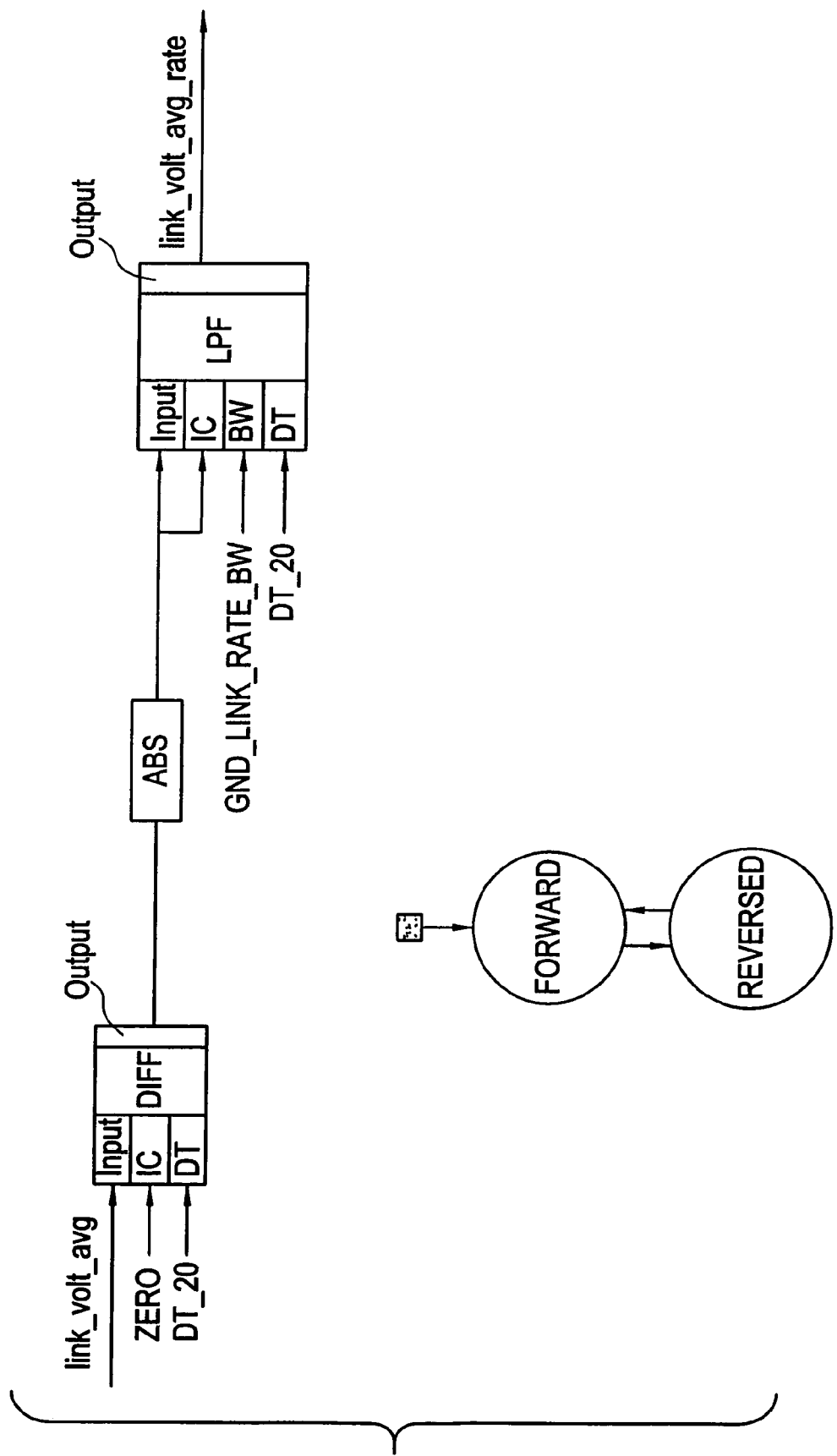
FIG. 15 is an exemplary diagram representing supplemental voltage function.

The supplemental voltage function system 18, illustrated in FIG. 15, calculates the rate of change to make sure the voltage has filtered out before any determination is made so there is no transience in the system's detection or decisions. The reason to allow for no transience is to insure that ground detection equipment can follow the voltage. In one embodiment, if the ground detection equipment is fast, then there is not a need to wait before determining if a ground exists. Thus in a preferred embodiment the transience needs only to settle down to a level where the ground detection equipment can follow it. The purpose of these functions is to support the propulsion circuit ground/failure detections and isolations.

This system provides the system with voltage average rates and alternator rectifier bias state information.

Figure 2:
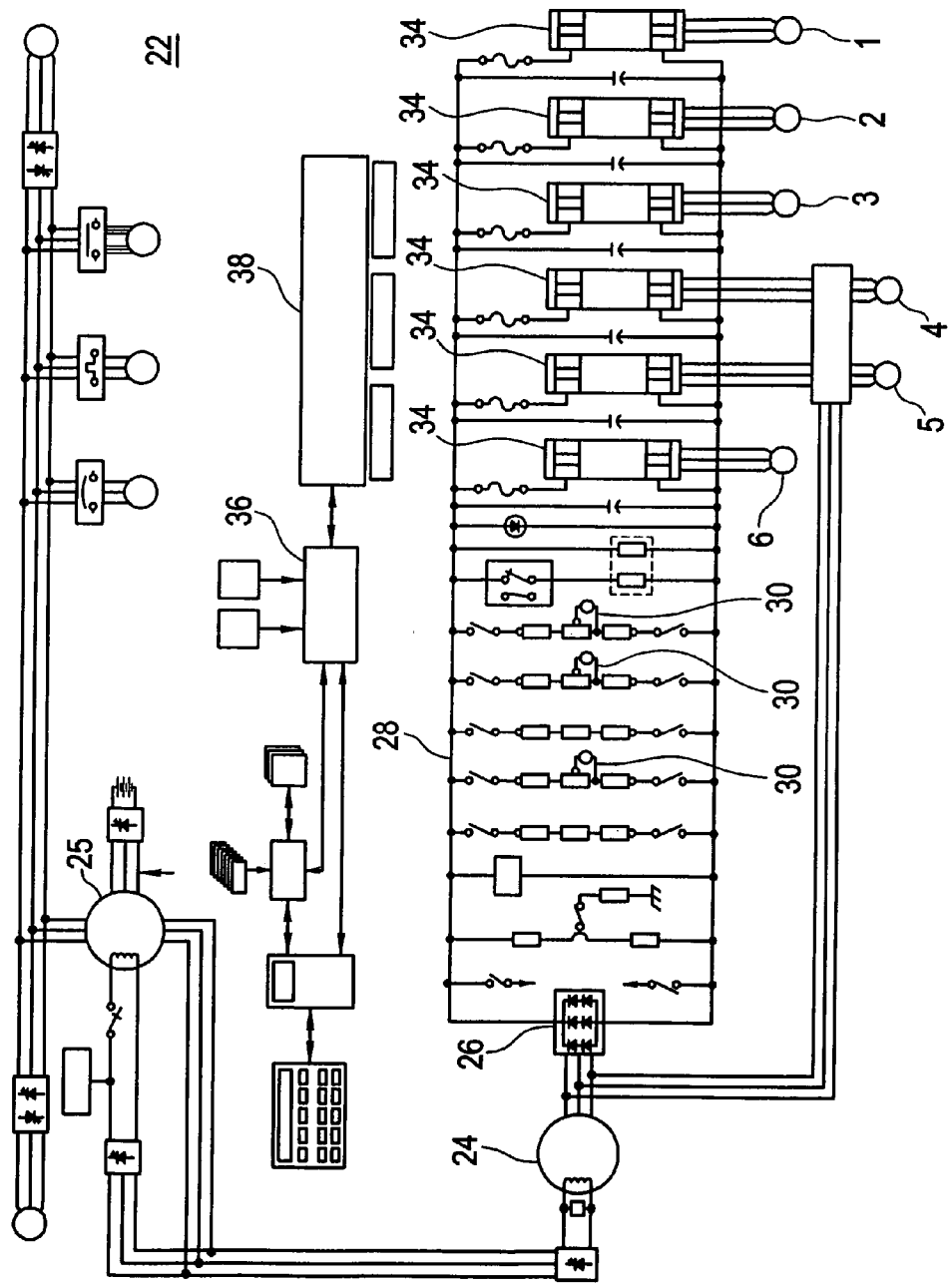
FIG. 2 is a simplified diagram of a typical power system for a diesel electric locomotive.

FIG. 2 is a simplified diagram of a typical power system for a diesel electric locomotive. As illustrated in FIG. 2, the power system comprises a circuit 22 that has an alternator 24, main rectifier 26, and dynamic braking grid 28, which includes blowers 30. Also illustrated are 6 traction motors 1, 2, 3, 4, 5, 6 each connected to an individual inverter 34. FIG. 2 also illustrates the propulsion system controller 36 and traction motor controller 38, which are utilized in part in the present invention.

Figure 3:
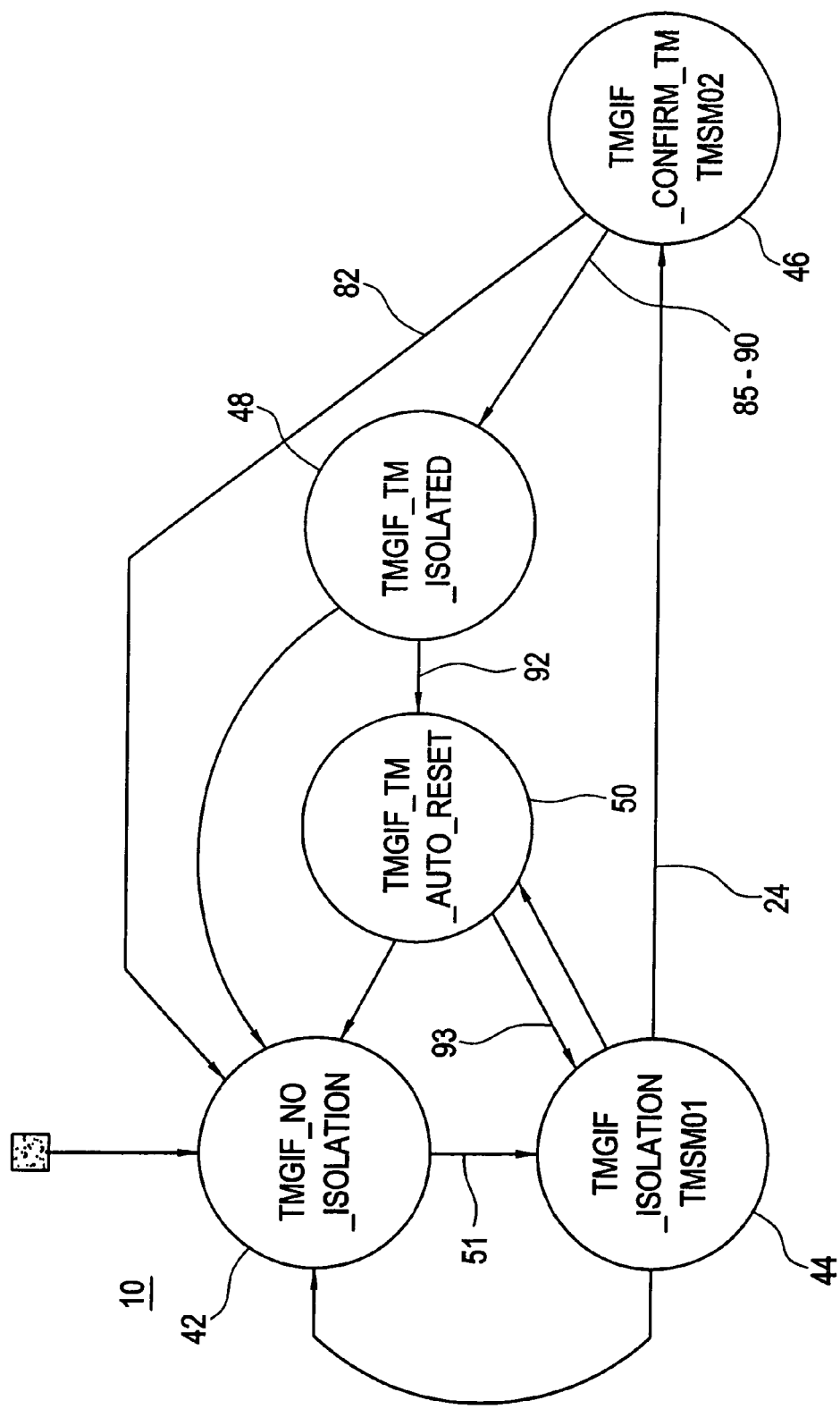
FIG. 3 is an exemplary diagram of an AC Ground Isolation State Machine.

FIG. 3 is an exemplary flow chart of the AC Ground Isolation State Machine. This state machine 10 is started whenever an AC ground is detected when the propulsion system 22 is either braking or motoring. The isolation process discussed below will continue until a conclusion is arrived at or an operator takes the unit out of a powered mode. This top state machine 10 controls the sub machines discussed below. This state machine 10 is used when an AC ground impedance change is detected in either any of the traction motors 1, 2, 3, 4, 5, 6, or alternator 24. The state machine 10 comprises a "No Isolation" or a first state 42, an "Isolation" or a second state 44, a "Confirm" or a third state 46, an "Isolated" or a fourth state 48, and a fifth "Auto Reset" state 50. The system starts in the "No Isolation" state 42 until an AC ground is detected. When an AC ground signal is detected, during either braking or motoring, the state machine 10 transitions 51 to the Isolation state 44 which has a sub state machine, which is further illustrated in FIG. 4.

Figure 4:
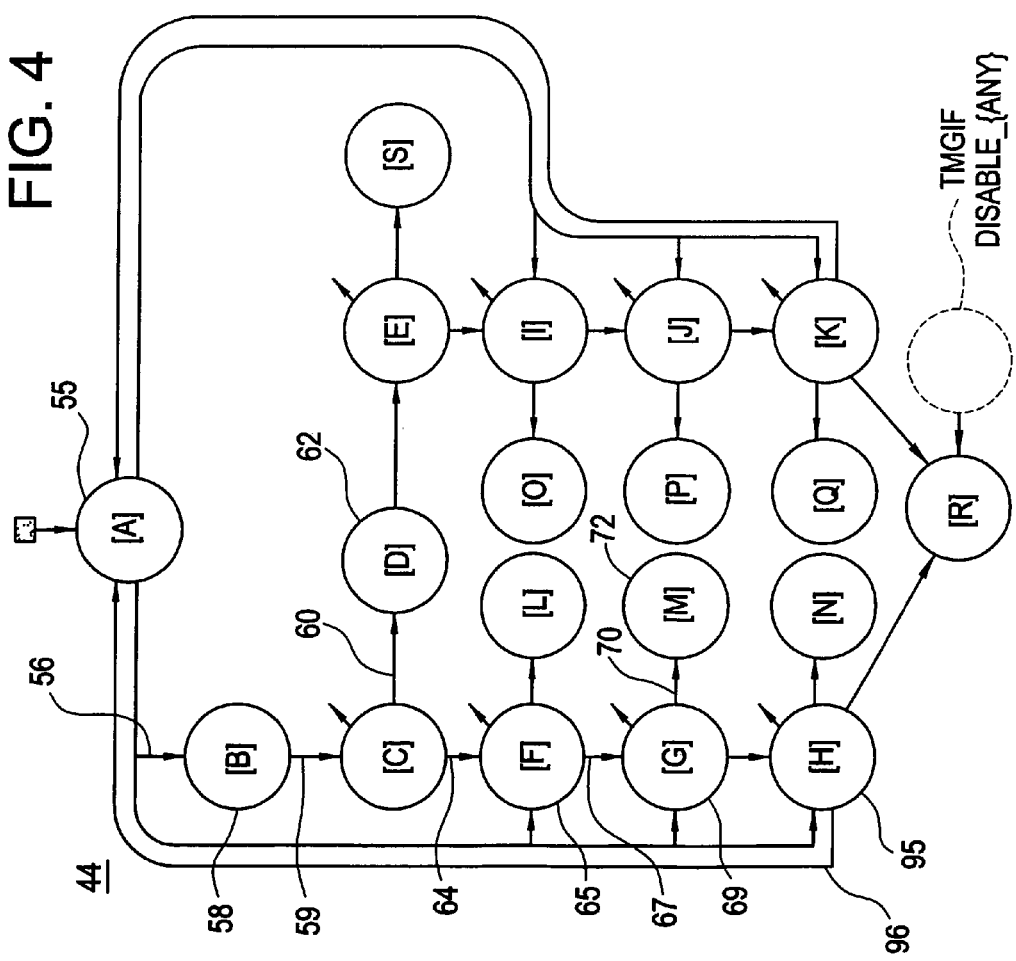
FIG. 4 is an exemplary diagram of an AC Ground Isolation Sub State Machine.

To best explain how the state machine 10 and sub state machines function, the following is an exemplary illustration. FIG. 4, in one embodiment, performs a binary sort of the traction motors 1, 2, 3, 4, 5, 6 and attempts to either suspect a traction motor or isolate the traction alternator 24. This is done by disabling traction motors to observe whether or not the ground goes away when a specific motor is disabled. Thus, the sub state machine 44 starts in a Setup state 55, and transitions based on the top-level state machine going into the Isolation state 44. At that point, the sub state machine 44 of FIG. 4 transitions 56 to a "Disable 1 through 3" Setup state 58, which means that the system is about to turn off or disable traction motors 1, 2, and 3.

In operation, the "Disable 1-2-3" Setup state 58 is really sending signals to begin reducing torque on the motors 33, 35, 37 before each is disabled, as will be discussed in more detail below with respect to FIG. 16. At transition 59 once the torque is at an acceptable limit, the motors 33, 35, 37 are turned off, or disabled, while motors 4, 5, and 6 are still running. The sub state machine 44 then looks for the ground signal again. If the ground is still detected, then the sub state machine 44 concludes that the ground was not in motors 1, 2 and 3 and transitions 60 to a "Disable 4, 5, and 6" Setup sub state. If a ground is not detected, then the system concludes that the ground is in either traction motors 1, 2, or 3.

As discussed previously, for illustration purposes only, assume the failure is in traction motor 2. Following this assumption, once the ground is no longer detected, the next step is to disable, or turn off, motor 1 by transitioning 64 to the "Disable 1" sub state 65, which turns motors 2 and 3 back on or enables and the only motor not running or disabled is motor 1. In this state, the sub machine 44 again makes a determination as to whether a ground is detected. If a ground is detected, then the sub machine 44 concludes that the ground is not in motor 1 and transitions 67 to a "Disable Motor 2" sub state 69, which turns motor 1 back on, leaves motor 3 on or enabled, and now disables motor 2. Thus, at this point, motors 1, 3, 4, 5, and 6 are on. Now in the "Disable Motor 2" sub state 69, the sub state machine 44 will try to detect the ground again. Assuming that Motor 2 has the ground, the sub state machine 44 will not register a ground, thus concluding that motor 2 is suspected of having a problem. The sub state machine 44 transitions 70 to the "Suspect 2" sub state 72, which reports that Motor 2 is suspected of having the problem.

Figure 5:
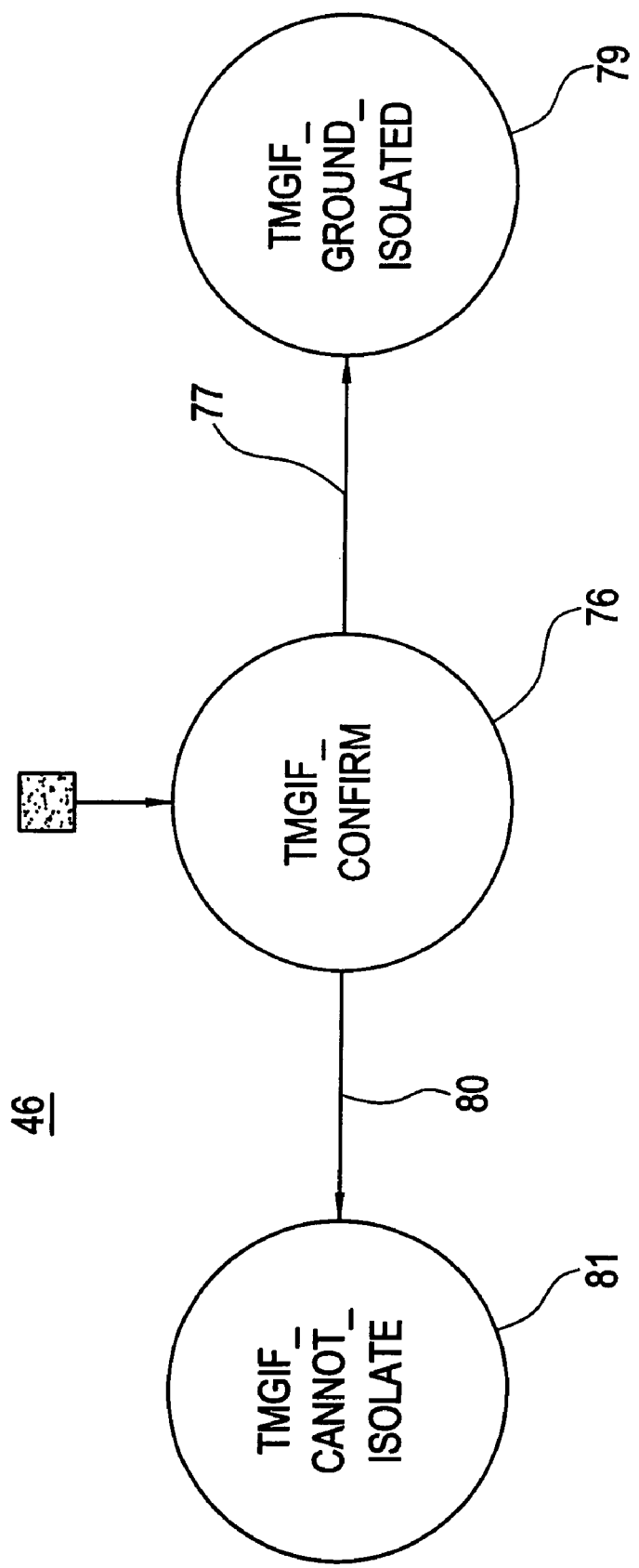
FIG. 5 is an exemplary diagram of an AC Ground Isolation Confirmation Sub State Machine.

Referring back to FIG. 3, the state machine transitions 74 to the "Confirm" state 46, which is illustrated in detail in FIG. 5. This transition 74 occurs only when the isolation state sub machine 44 suspects a component. In this sub state 46 illustrated in FIG. 5, since this sub state 46 knows that motor 2 is the suspected motor, it will enter a "Confirm" sub state 76 and command the sub machine 46 to turn Motor 2 back on or to enable motor 2. If the ground is still detected, the sub state machine 46 transitions 77 to a "Ground Isolate" sub state 79. If the ground is not detected, the sub state machine 46 transitions 80 to a "Cannot Isolate" sub state 81. Referring to FIG. 3, when the "Cannot Isolate" sub state 81 is reached, the "Confirm" sub state transitions 82 to the "No Isolation" sub state 42, where the system will go through the state machine 10 again if a ground is still being detected.

Referring to FIG. 3, the state machine 10 transitions 85, 86, 87, 88, 89, 90 from the "Confirm" state 46 to the "Isolated" state 48. Transition states 85, 86, 87, 88, 89, 90 are representative of each axle or each traction motor 1, 2, 3, 4, 5, 6. In the illustration presented, the state machine 40 would use transition 86, which is for traction motor 2. The state machine 40 will remain in the "Isolated" state 48 until the restriction imposed on motor 2 is reset. This restriction can be reset by an operator, by the state machine 10, or by a supervisory controller (not shown). The operator may want to reset the restriction if he has made a change to the system which he suspects will correct the problem detected. In a preferred embodiment, the operator would have access to a button or data entry codes that reset the restriction.

Because the restriction may have resulted from a condition, which may be correctable by operation of the propulsion system 22, such as a moisture-related failure or evaporation of a contaminant, it is preferable to determine that it is not a transitory kind of ground. Therefore, the state machine 10 will remain in the "Isolated" state 48 for a specified time period, such as two minutes, before the state machine 10 automatically resets itself. After the given time period passes, the state machine 10 transitions 92 to an "Auto Reset" state 50. The state machine 10 will remain in this state 50, and if the ground is detected again, the state machine 10 will transition 93 back to the "Isolation" state 44.

Transition 93 includes a variable that remembers which axle or motor was previously isolated or suspected of having the ground. Thus, when the state machine 10 returns to the "Isolation" state 44, it does not go through the whole sub state machine 44 processes again, but instead moves right to the state specific to the motor detected originally. Even if the operator manually resets the state machine 10, if the ground is still detected, the state machine 10 will return to the "Isolation" state 44 and to the state specific to the axle or motor that triggered the system 8 originally. Thus, referring to FIG. 4, the sub state machine 44 will jump to the "Disable 2" sub state 69 and then the "Suspect 2" sub state 72 if the ground is still found. Referring to FIG. 3, the state machine 10 would then transition 74 to the "Confirm" state 46. Since the state machine 10 has now detected the trouble in the same motor, when this motor is eventually isolated, in the "Isolated" state 48, the state machine 10 will allow a reset only after a longer period of time, such as an hour.

If the ground is not in the same motor, the sub state machine 44, FIG. 4, will then transition to the next motor disable state in the sub state machine 44, for example, "Disable 3" state 95. If the ground is still detected, the sub state machine 44 will transition 96 to the "Setup" state 55 and start searching for the ground again from the beginning. In the process of searching all of the traction motors, the sub state machine 44 will also verify that AC ground detection is not detected in the alternator 24.

Thus sub state machine 44 disclosed in FIG. 4 checks whether there is previous information or not. If there is no previous information, it performs a search, such as a binary search and then proceeds to a search of each motor 1, 2, 3, 4, 5, 6 and the alternator 24. If previous information is available, the sub state machine 44 uses that information as a starting position.

Figure 17:
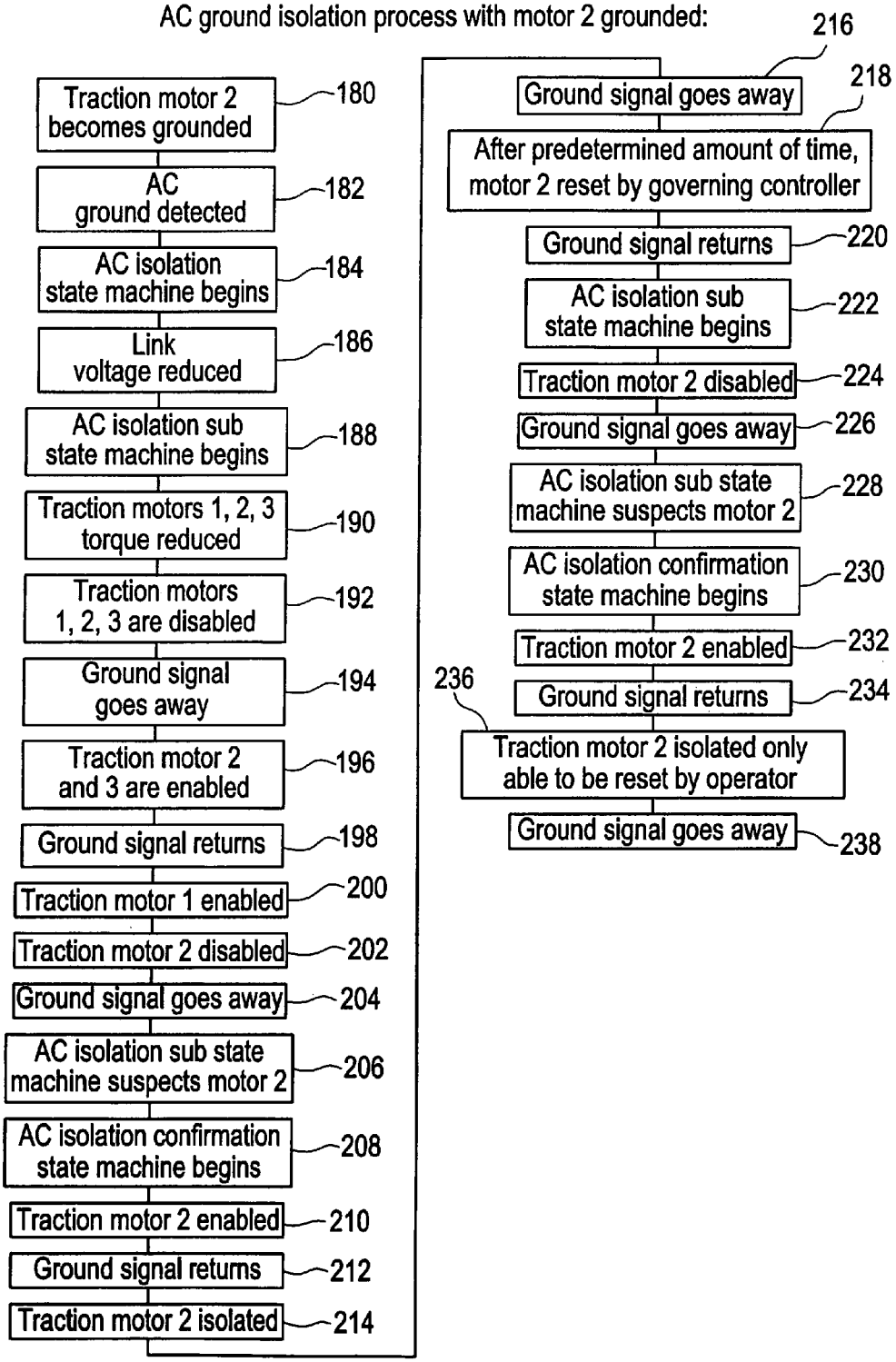
FIG. 17 is an exemplary process flow further illustrating the AC ground isolation state machine.

FIG. 17 is an exemplary process flow illustrated to further understand the AC ground isolation state machine based on the example discussed above. A traction motor 2 becomes grounded, step 180, and an AC ground is detected, step 182. The AC isolation state machine begins, step 184, where the link voltage is reduced, step 186, and the AC isolation sub state machine begins, step 188. The torque on traction motors 1,2, and 3 are then reduced, step 190, and then these traction motors are disabled, step 192. If the ground signal goes away or is no longer detected, step 192, traction motor 2 and 3 are enabled, step 196. If the ground signal returns, step 198, traction motor 1 is enabled, step 200, and traction motor 2 is disabled, step 202. If the ground signal goes away again, step 204, the AC isolation sub state machine suspects motor 2, step 206, and enters the AC isolation confirmation state machine, step 208. Traction motor 2 is enabled, step 210, to see if the ground returns, step 212. Detecting the ground again, traction motor 2 is isolated, step 214, and the ground signal goes away again, step 216. After a predetermined amount of time, traction motor 2 is reset by a governing controller, step 218. If the ground signal then returns, step 220, the AC isolation sub state machine begins again, step 222. Instead of going through each motor again, the sub state machine begins by disabling traction motor 2, step 224. If the ground goes away, step 226, the AC isolation sub state machine suspects motor 2, step 228, and the AC isolation confirmation state machine begins, step 230. Traction motor 2 is enabled again, step 232. If the ground signal returns, step 234, traction motor 2 is isolated where it is only able to be reset by an operator, step 236, and thus the ground signal goes away, step 238.

Figure 6:
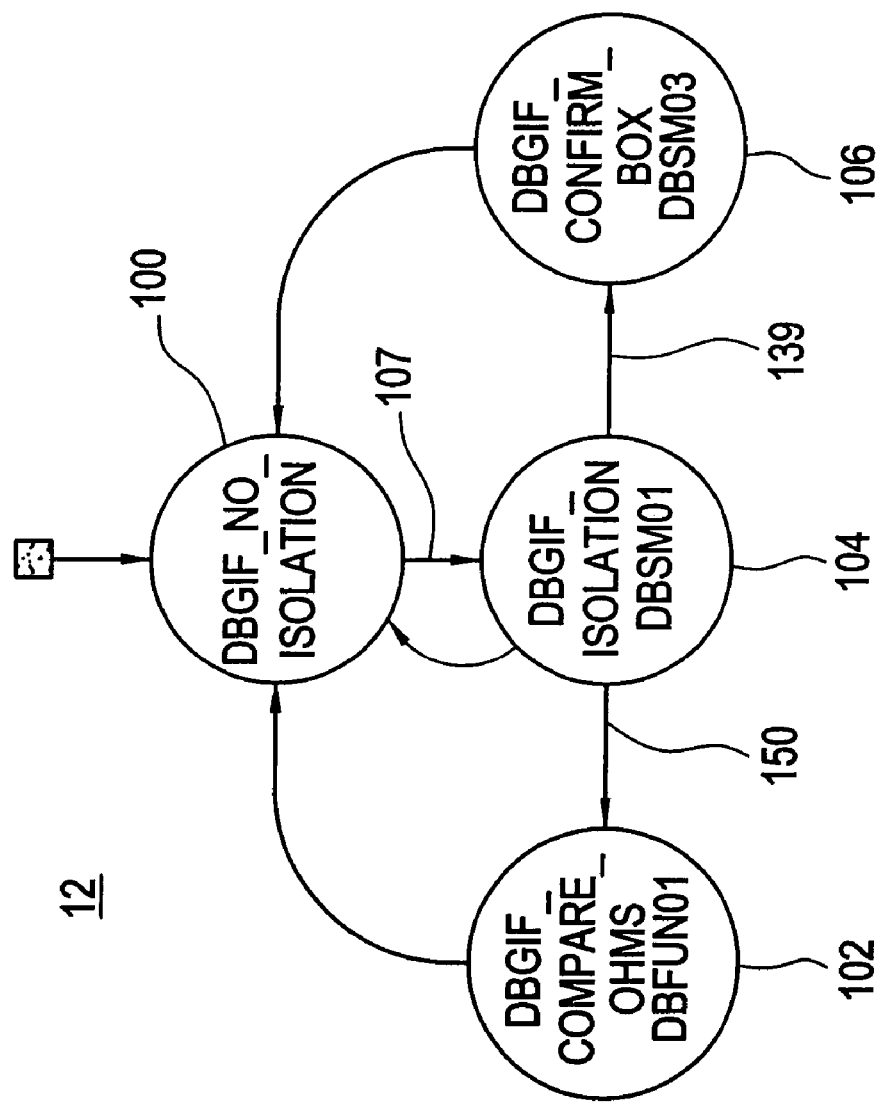
FIG. 6 is an exemplary diagram of a DC Ground Isolation State Machine.

FIG. 6 is an exemplary embodiment of a DC ground isolation state machine. This state machine 12 is started whenever a DC ground is detected in either ready power, brake setup, braking or self-load. This isolation process will continue until a conclusion is reached or the operator takes the unit out of a powered mode. This top state 12 machine controls the sub state machines discussed below. This state machine comprises a "No Isolation" state 100, an "Isolation" state 104, a "Confirm Box" state 106, and a "Compare Ohms" state 102. To best illustrate how this state machine 12 operates, assume a ground has developed on grid box 102. Once a ground is detected, the state machine transitions 107 from a "No Isolation" state 100 to an "Isolation" state 104. The "Isolation" state 104 is further detailed in FIG. 7. This sub state machine 104 performs a sequential search of the grid boxes 102, 103, 104 and attempts to either suspect a grid box or the DC bus and inverters. It will then disable grid boxes in such a manner that only one grid box is in the circuit 22 at a time where an observation will be made if the ground is present at that time. The sub state machine 104 first enters a "Count Boxes" or first sub state 110 to determine the number of boxes, or grids, that are actually in the propulsion system 22. In one embodiment, if the propulsion system 22 comprises only one grid or box, the sub state machine 104 does not need to go through any sort of isolation process and would simply transition 111 to a "Suspect Sub" sub state 115.

Figure 7:
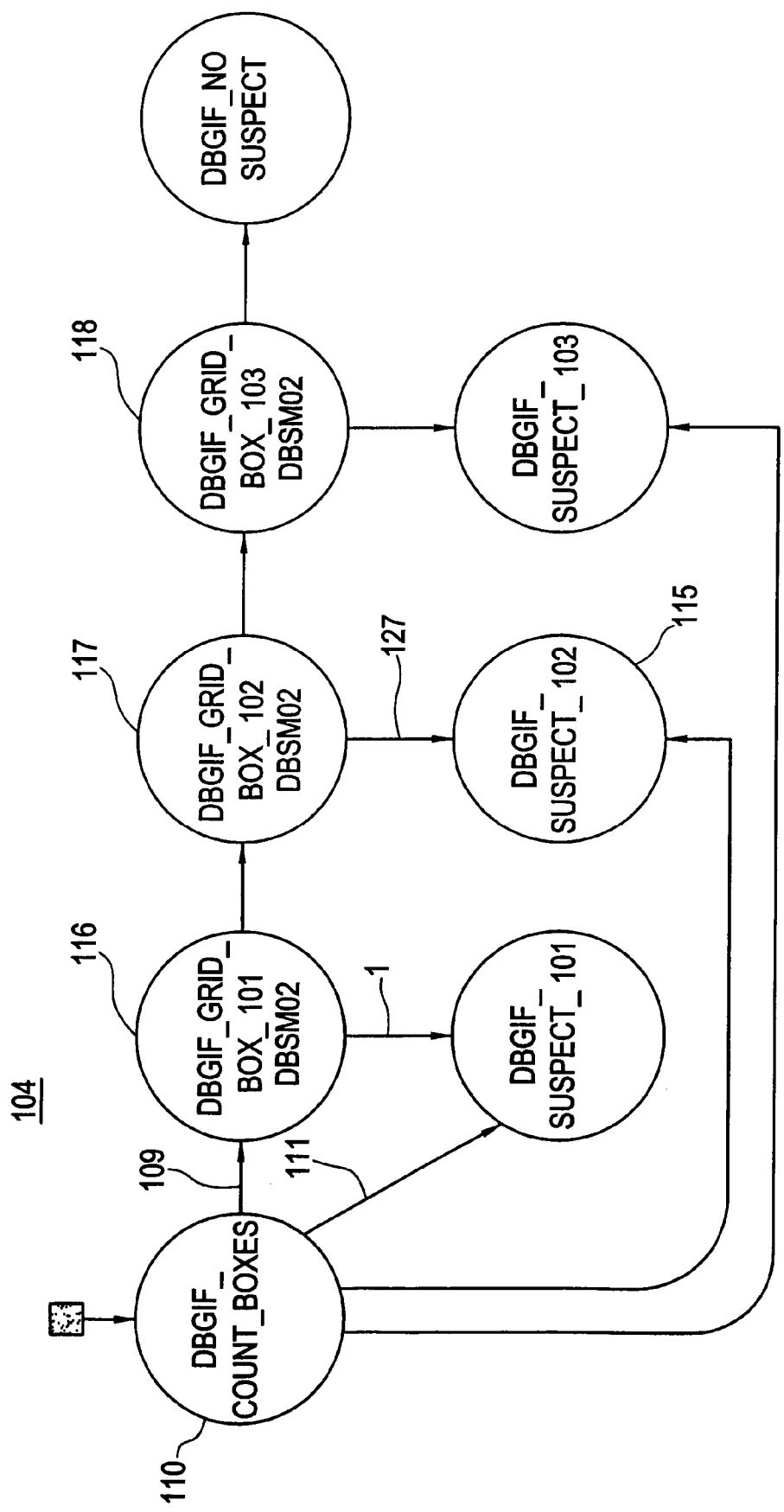
FIG. 7 is an exemplary diagram of a DC Ground Isolation Sub State Machine.
Figure 8:
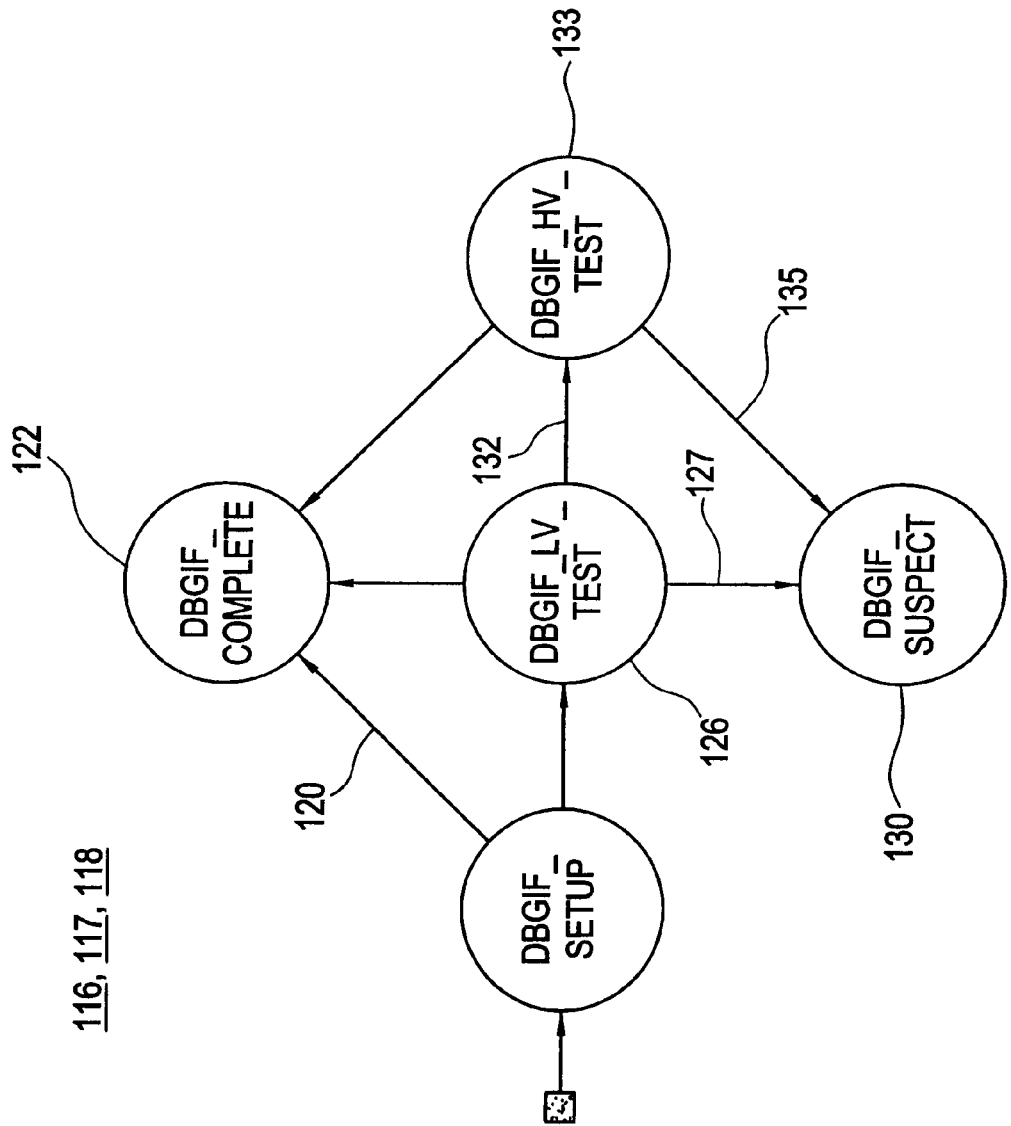
FIG. 8 is an exemplary diagram of a DC Ground Isolation Grid Box Sub State Machine.

But where multiple grid boxes exist, such as three as illustrated in FIG. 7, the sub state machine 104 will examine each box, at either a "Grid Box 101" state 116, a "Grid Box 102" state 117, or a "Grid Box 103" state 118. The grid boxes not being examined in any of these given states are turned off. An exemplary example of each "Grid Box" sub state 116, 117, 118 is illustrated in FIG. 8. This sub state machine 116, 117, 118 is reused for each grid box. Transitioning to this sub state machine 116, 117, 118 disables the other grid boxes in the propulsion system 22. The sub state machine 116, 117, 118 will transition 120 to a "Complete" sub state 122 if the grid box being examined has already been restricted previously. For example, referring back to FIG. 7, if Grid Box 101 was disabled previously, and a DC ground was detected, the system 8 would again start by analyzing Grid Box 101, but when detecting a restriction on Grid Box 101, it will transition 120 to the "Complete" state 122 in FIG. 8.

Again, assuming that the ground is in Grid Box 102, after analyzing Grid Box 101, the state machine would then analyze Grid Box 102 using the "Grid Box 102" sub state 117. The sub state machine 117 would first perform a low voltage test as part of the "Low Voltage Test" state 126. In one embodiment, the grid box is provided with a limited voltage, such as 875 volts, and then looks for a DC ground signal. The reason for a low voltage test is to reduce a chance of fire or severely damaging the grid box.

If the grid box fails the low voltage test, or in other words a ground is detected, the sub state machine 117 transitions 127 to a "Suspect" sub state 130. If the grid box passes the low voltage test, the sub state machine 117 transitions 132 to a "High Voltage Test" state 133. If the grid box fails the high voltage test, or detects a ground, the sub state machine 117 transitions 135 to the "Suspect" sub state 130. Referring back to FIG. 7, the parent sub state machine 104 would then transition 127 to the "Suspect 102" sub state 115. Referring back to FIG. 6, the state machine 12 transitions 139 to a "Confirm Box" state 106. The "Confirm Box" state 106 is further disclosed in FIG. 9.

Figure 9:
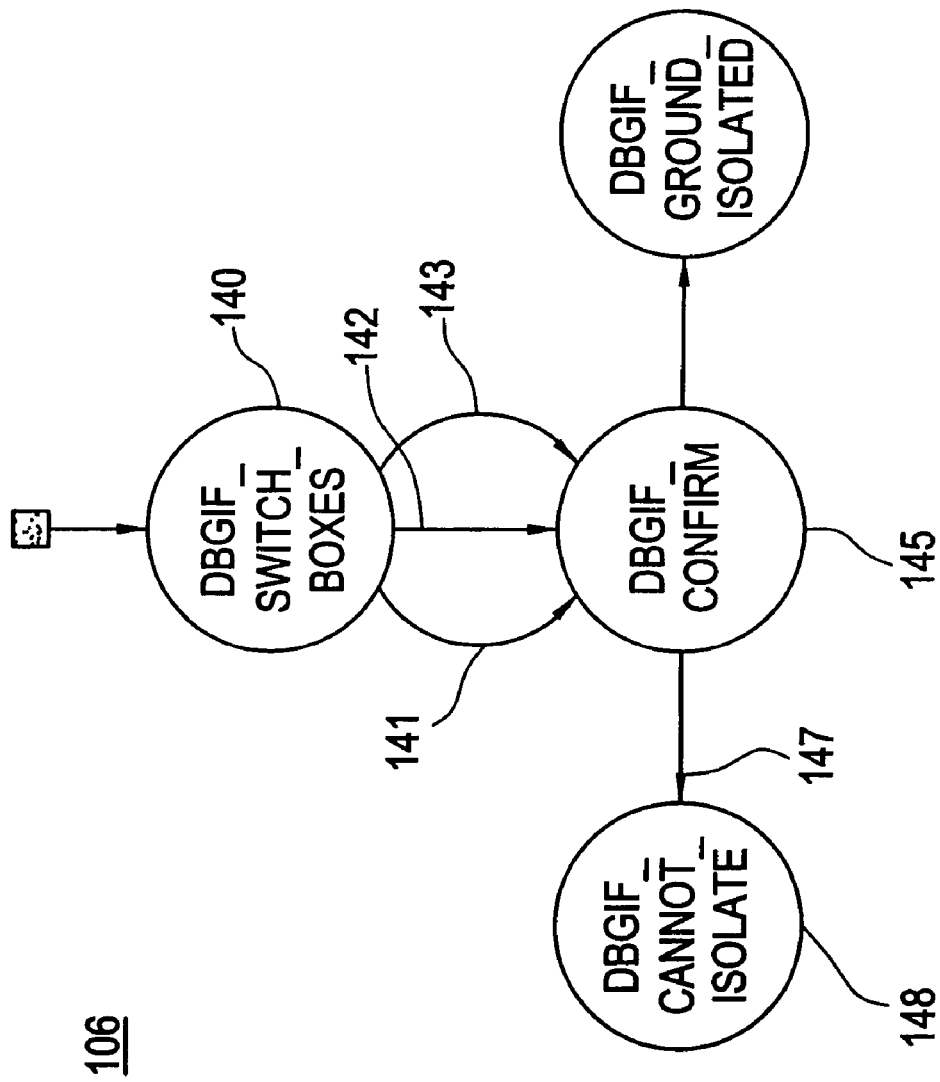
FIG. 9 is an exemplary diagram of a DC Ground Isolation Confirmation Sub State Machine.

As illustrated in FIG. 9, the grid boxes in which a ground was not detected are turned back on or enabled. This is done in the "Switch Boxes" sub state 140 where the suspect grid box is left off or disabled and the sub state machine 106 transitions 141, 142, 143 the other two grid boxes, in this case, using transitions 141 and 143, to a "Confirm" sub state 145. If a ground is still detected, the sub state machine 106 transitions 147 to a "Cannot Isolate" state 148, and the state machine 12 concludes that the ground is somewhere else in the propulsion system 22. Referring back to FIG. 6, the state machine 12 transitions 150 to the "Compare Ohms" state 102, which is also known as the Dynamic Braking Grid Failure Isolation State Machine.

Figure 18:
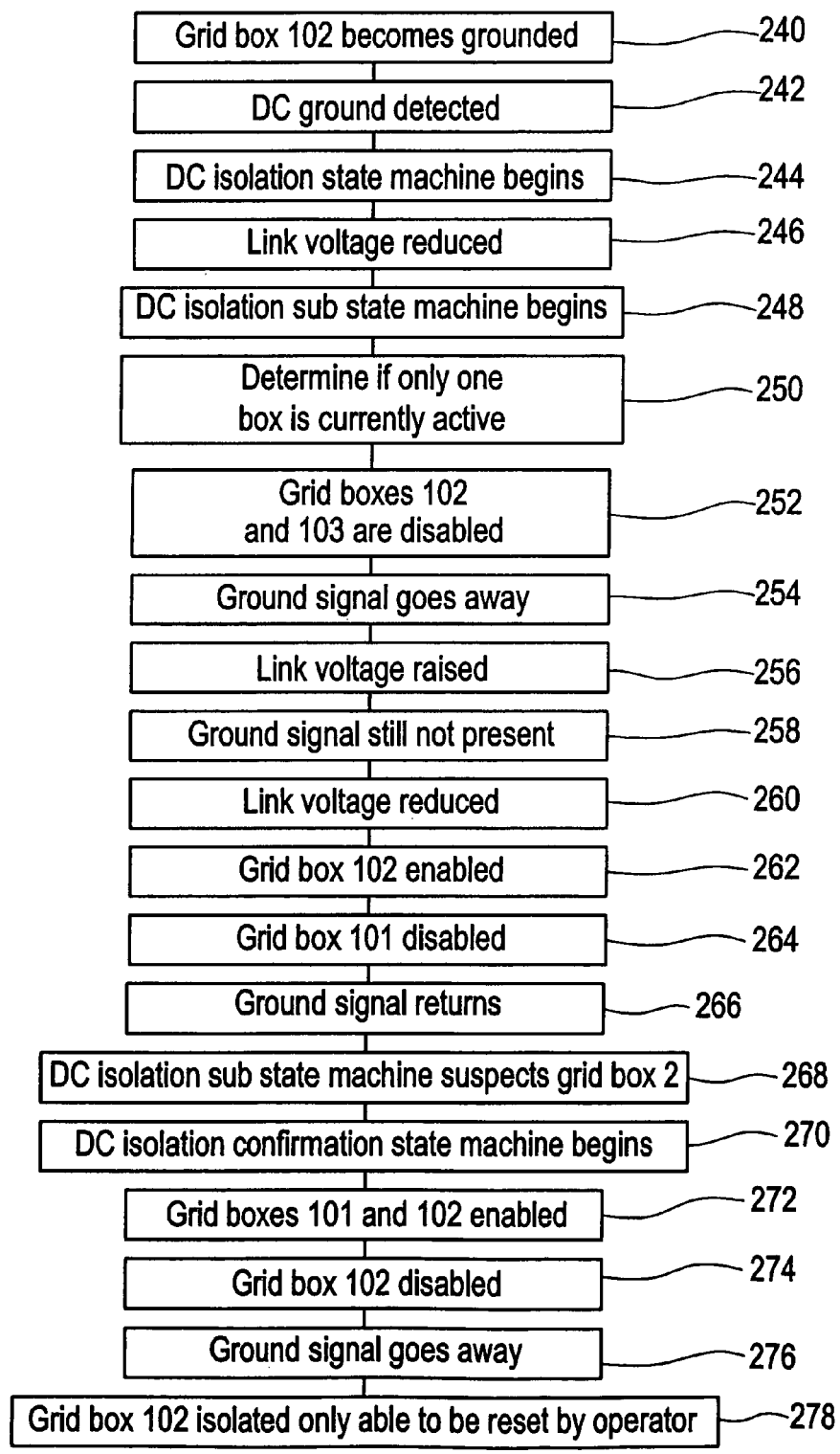
FIG. 18 is an exemplary process flow further illustrating the DC ground isolation state machine.

FIG. 18 is an exemplary process flow illustrated to further understand the DC ground isolation state machine based on the example discussed above. A grid box 102 becomes grounded, step 240, and a DC ground is detected, step 242. The DC isolation state machine begins, step 244, where the link voltage is reduced, step 246, and the DC isolation sub state machine begins, step 248. Next, a determination is made as to if only one box is currently active, step 250. Grid boxes 102 and 103 are then disabled, step 252. If the ground signal goes away or is no longer detected, step 254, the link voltage is raised, step 256. If the ground signal is still not present, step 258, the link voltage is reduced, step 260, and grid box 102 is enabled, step 262, while grid box 101 is disabled, step 264. If the ground signal returns, step 266, the DC isolation sub state machine suspects grid box 102, step 268, and enters the DC isolation confirmation state machine, step 270. Grid boxes 101 and 103 are enabled, step 272, and grid box 102 is disabled, step 274, to see if the ground goes away, step 276. Grid box 102 is isolated and is only able to be reset by the operator, step 278.

Figure 10:
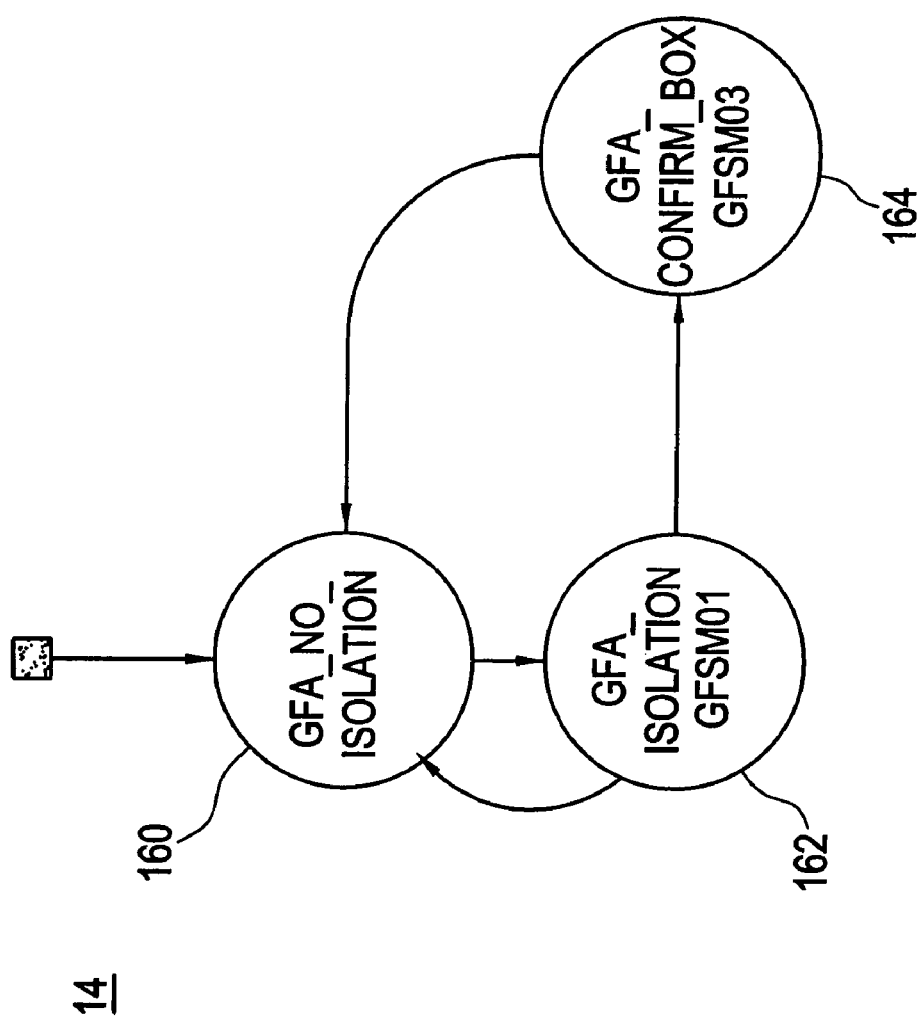
FIG. 10 is an exemplary diagram of a Dynamic Braking Grid Failure Isolation State Machine.

FIG. 10 is an exemplary embodiment of the Dynamic Braking Grid Failure Isolation State Machine. This state machine 14 is similar to the DC Ground Isolation State Machine 12, except here the state machine is detecting changes in grid resistance instead of ground current feedbacks. Additionally, since this state machine 14 is detecting grid resistance changes, the "Compare Ohms" state 102 of the DC Ground Isolation State Machine is not present. Thus, this state machine 14 comprises a "No Isolation" state 160, an Isolation state 162, and a Confirm Box state 164. This state machine 14 is started whenever a significant change in a resistance ratio of estimated to modeled aggregate grid resistance is detected in either braking or self-load. A modeled resistance is a nominal resistance value based on a circuit configuration with adjustments for thermal considerations, such as tolerance. An estimated resistance is a calculated value of resistance based on a power, voltage, or current feedback in the circuit. A resistance ratio is the estimated resistance divided by the modeled resistance. The isolation process will continue until a conclusion is reached or the operator takes the unit out of a powered mode. This top state machine 14 controls the sub state machines illustrated in FIGS. 11-13.

Figure 11:
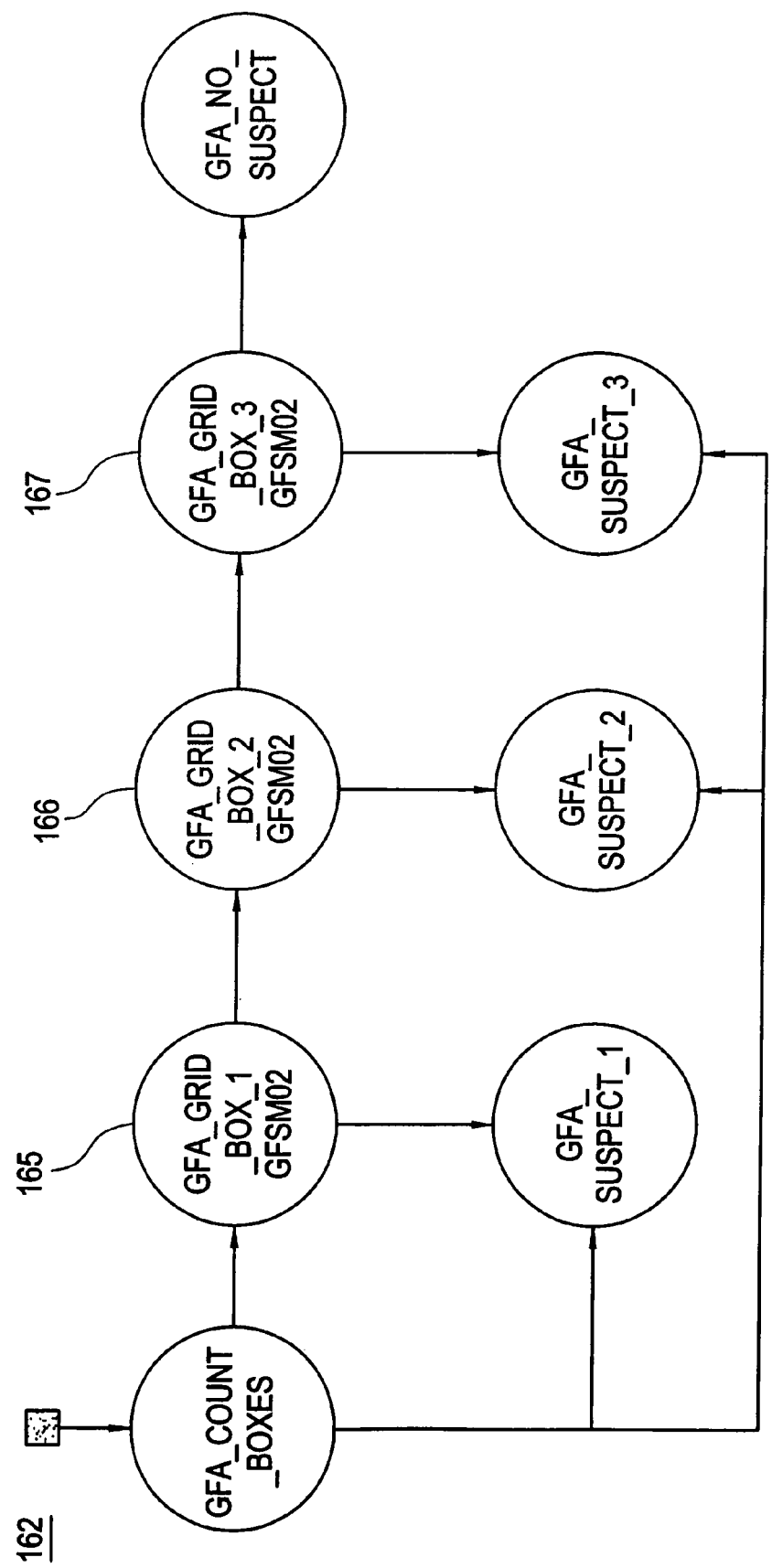
FIG. 11 is an exemplary diagram of a Dynamic Braking Grid Failure Isolation Sub State Machine.
Figure 12:
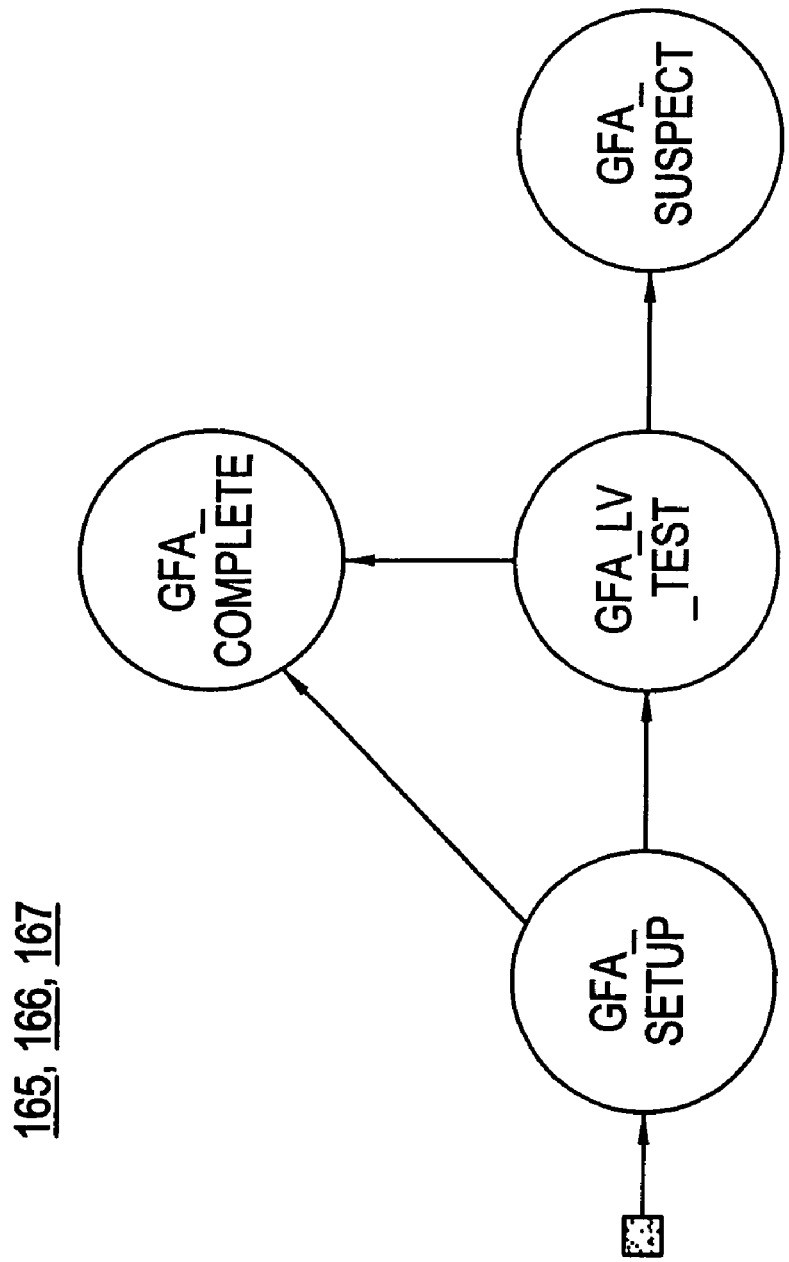
FIG. 12 is an exemplary diagram of a Dynamic Braking Grid Failure Isolation Grid Box Sub State Machine.
Figure 13:
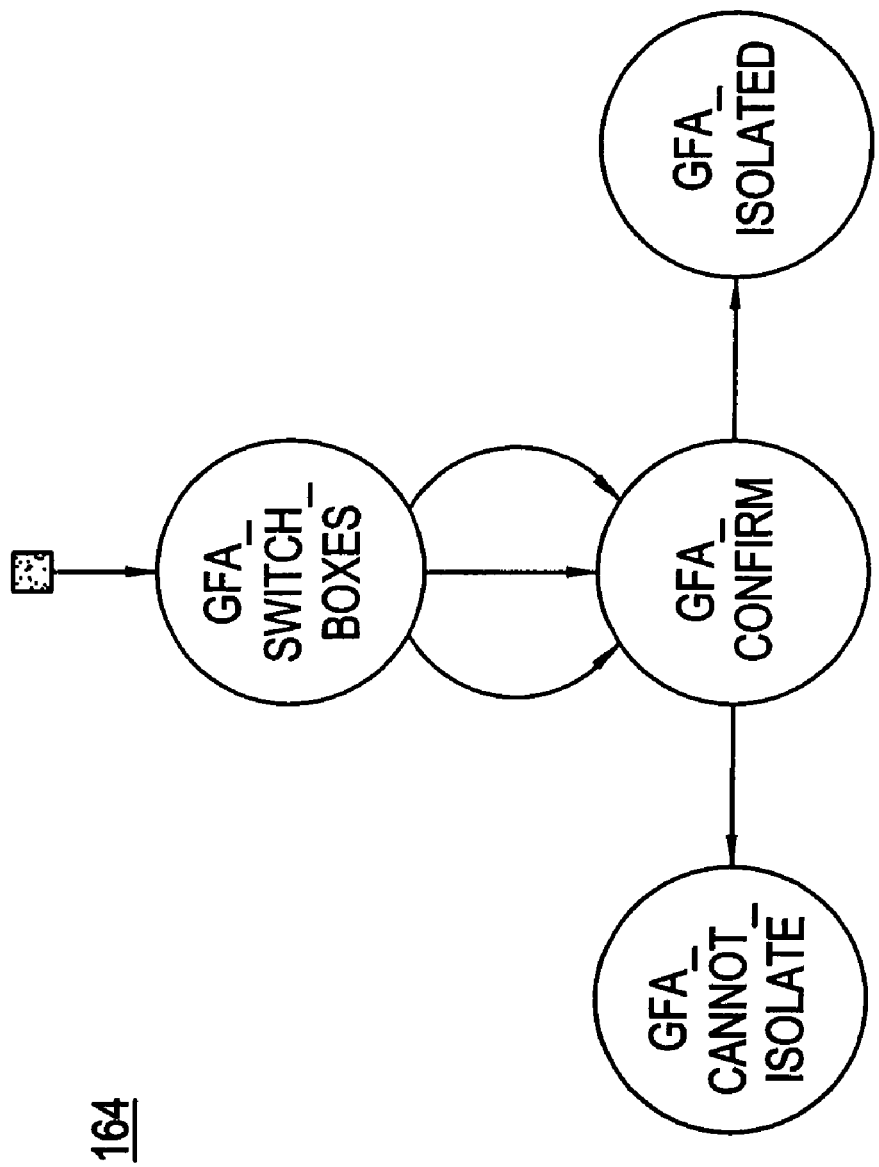
FIG. 13 is an exemplary diagram of a Dynamic Braking Grid Failure Isolation Confirmation Sub State Machine.

Similar to FIG. 7 of the DC Ground Isolation State Machine, FIG. 11 illustrates a sub state machine 162 that performs a sequential search of the grid boxes and attempts to suspect a grid box. It disables grid boxes so that only one grid box is in the circuit at any given time and observes if the grid resistance ratio is significantly in error at that time. Similar to FIG. 8 of the DC Ground Isolation State Machine, FIG. 12 illustrates a sub state machine that is reused for each grid box. This sub state machine 165, 167, 168 first ensures that only the grid box intended by the parent state 162 machine is on. Upon confirmation of this fact, the state machine 14 observes for significant errors in the grid resistance ratio. If an error is found, the grid box is suspected. Likewise, if no error is detected, the grid box is not suspected. Similar to FIG. 9 of the DC Ground Isolation State Machine, FIG. 13 illustrates a sub state machine 164 that ensures that the suspected grid box is not operating in the propulsion circuit 22. Once this condition is met, and if the grid resistance ratio returns to an expected range, the suspected grid box is confirmed. If the grid resistance ratio is significantly in error though, the suspected grid box is left unrestricted.

Figure 19:
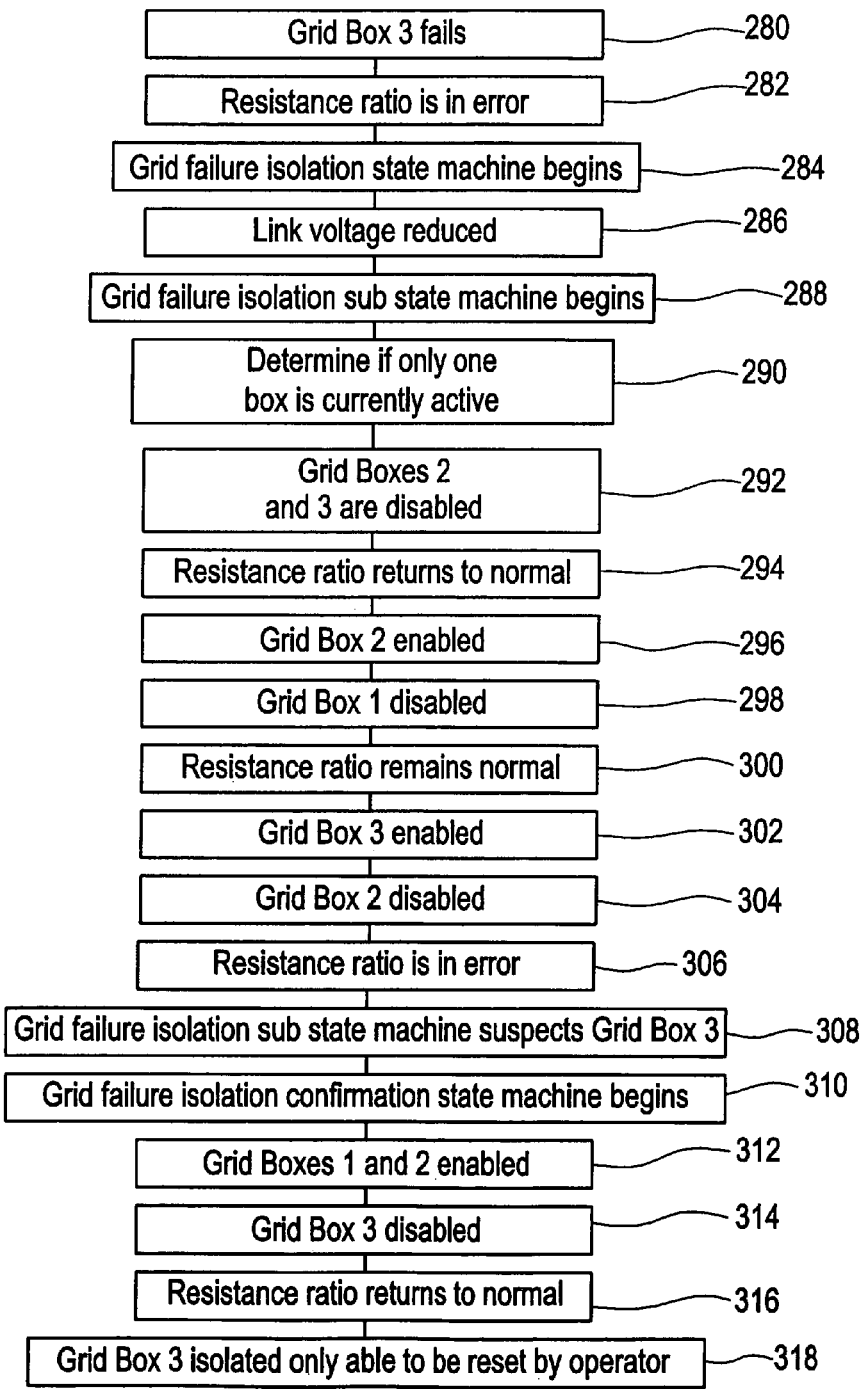
FIG. 19 is an exemplary process flow further illustrating the dynamic braking grid failure isolation state machine.

FIG. 19 is an exemplary process flow illustrated to further understand the dynamic braking grid failure isolation state machine based on the example discussed above. A grid box 103 fails, step 280, and a resistance ratio is in error, step 282. The grid failure isolation state machine begins, step 284, where the link voltage is reduced, step 286, and the grid failure isolation sub state machine begins, step 288. Next, a determination is made as to if only one box is currently active, step 290. Grid boxes 102 and 103 are then disabled, step 292. If the resistance ratio returns to normal, step 294, grid box 102 is enabled and grid box 101 is disabled, steps 296-298. If the resistance ratio remains normal, step 300, grid box 103 is enabled, step 302, while grid box 102 is disabled, step 304. If the resistance ratio is in error, step 306, the grid failure isolation sub state machine suspects grid box 103, step 308, and enters the grid failure isolation confirmation state machine, step 310. Grid boxes 101 and 102 are enabled, step 312, and grid box 103 is disabled to see if the ground goes away, step 316. Grid box 103 is isolated and is only able to be reset by the operator, step 318.

FIG. 14 discloses the Dynamic Braking Grid Failure Early Detection algorithm. This algorithm 16 is applied to make an early determination regarding whether the braking grid has failed before using the state machines 10, 12, 14. More specifically, this logic is applied to detect obvious failures that could not wait for an isolation process to run. The combination logic takes into account the current state for a multitude of variables. There are two modes of operation for this algorithm 14. Either all grid boxes are in use, step 320, or less than a maximum grid boxes are in use. When all grid boxes are in use, certain minimum conditions are required. These minimum conditions are selected based on an accuracy of the sensors, models and erroneous detection possibilities. For example, a minimum horsepower, such as 500 Hp, a minimum voltage, such as 150 volts, a minimum blower speed, and a status of the propulsion system, such as being in a braking condition. With these requirement met, resistance ratios and blower speed comparisons under various conditions are observed and compared to models, in one embodiment maintained in a computer database, to determine anomalies that indicate immediate failure, steps 322-338.

For example, all blowers 30 should operate within similar parameters. If the system 8 detects a blower 30 that is not running a similar speed to the other blowers 30 and/or the resistance measured is also out of acceptable parameters, the system 8 will disable the grid containing this blower, step 332. If less than all grids are in use, FIG. 14 is applied. For example, if there are only two blowers in use, Label L, step 338, would be applied comparing the blower speed to a modeled blower speed to determine which blower is not functioning properly.

Figure 16A:
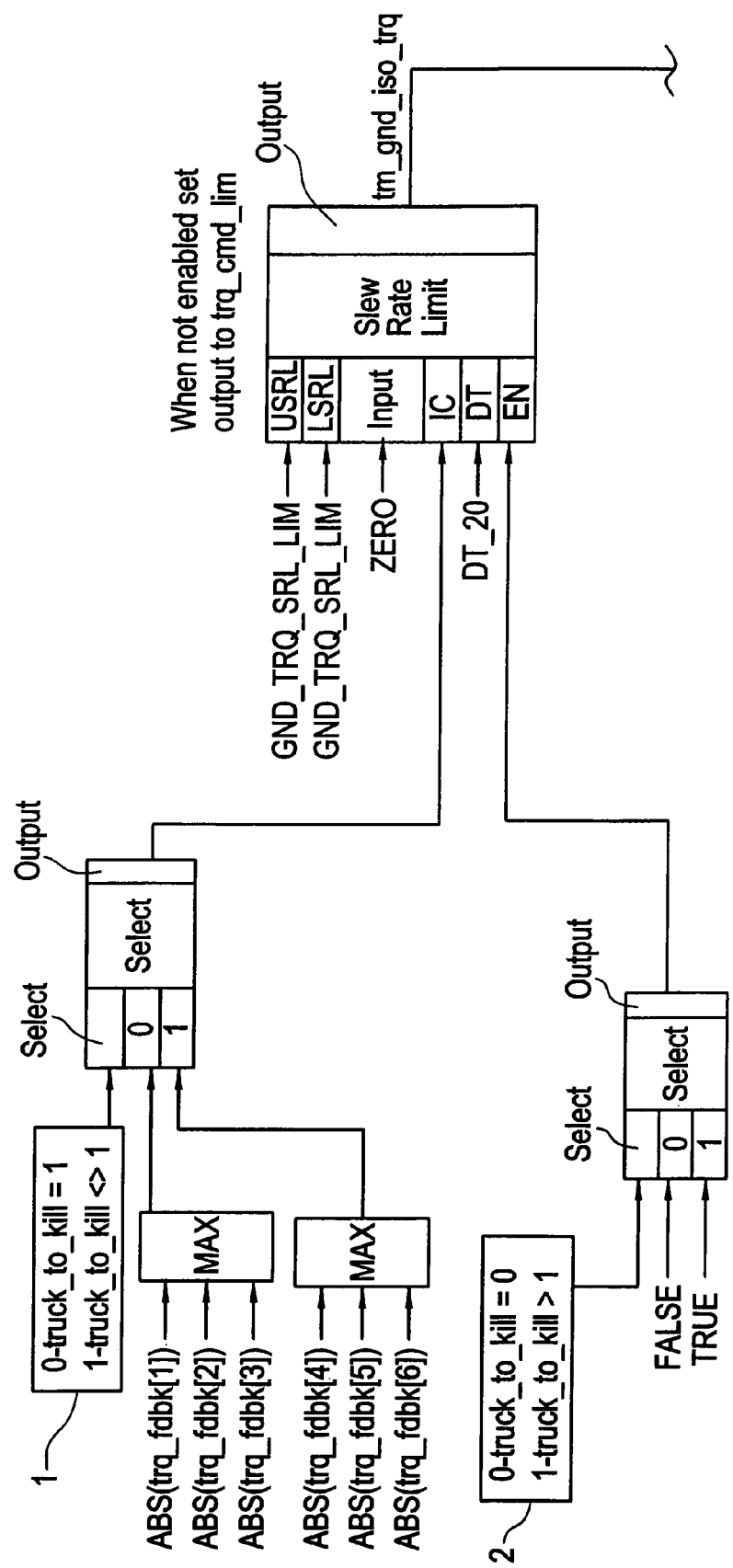
FIG. 16 is an exemplary diagram illustrating traction motor isolation per axle torque limit.
Figure 16B:
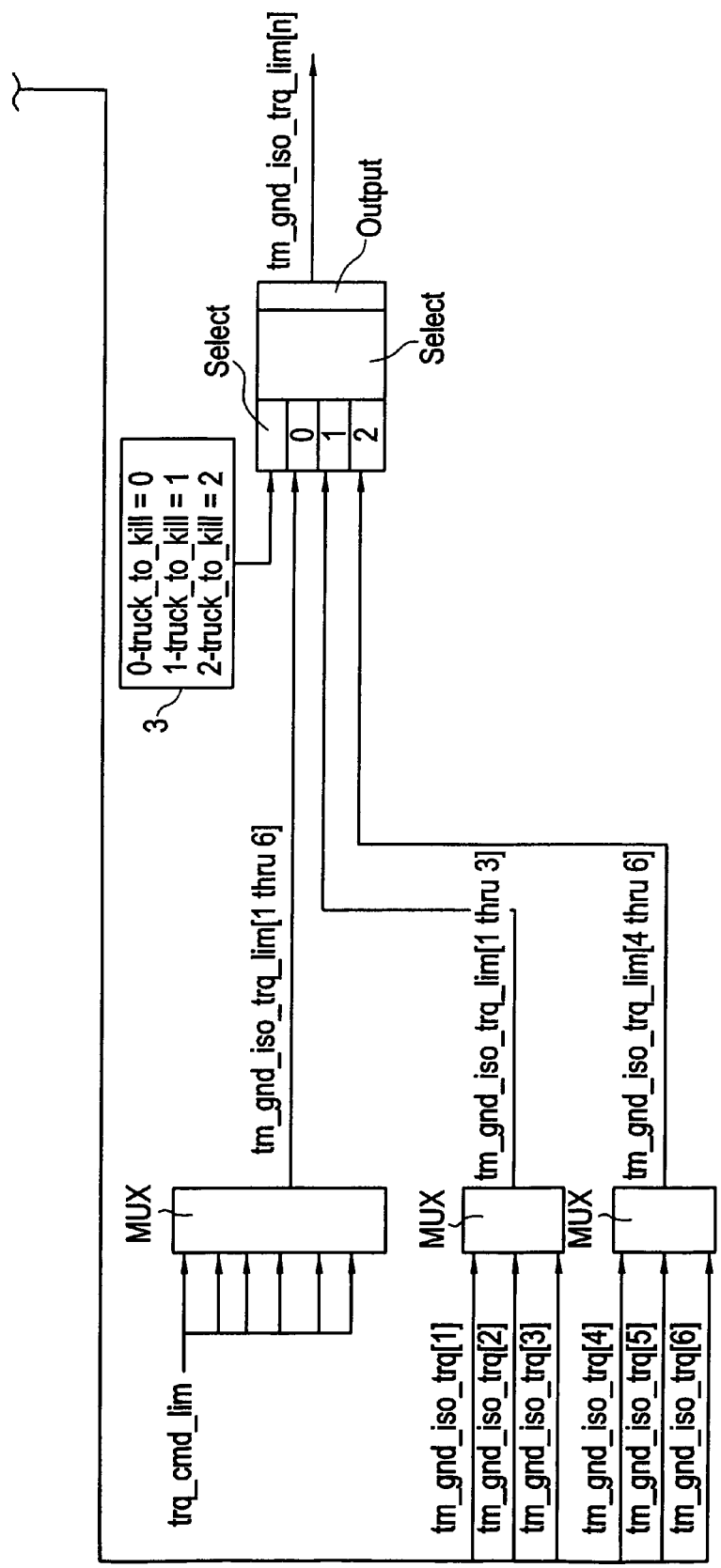

FIG. 16 illustrates the traction motor ground isolation per axle torque limit 20. This is specific to reducing torque on a motor before shutting down a truck, or traction motors 1, 2, 3, 4, 5, 6, so that the locomotive will not abruptly feel the change resulting from a loss of a truck, or combination of motors, such as motors 1, 2, and 3 as previously discussed. By doing this, the train or locomotive jerk is minimized. If this function were not performed then large train or locomotive jerks would occur whenever this system was implemented.

While the invention has been described in what is presently considered to be a preferred embodiment, many variations and modifications will become apparent to those skilled in the art. Accordingly, it is intended that the invention not be limited to the specific illustrative embodiment but be interpreted within the full spirit and scope of the appended claims.

What is claimed is:

1. A system for isolating electrical ground faults and secondary failures in an off road vehicle propulsion system, said system comprising:
   an AC ground isolation state machine for isolating a traction motor or alternator when an AC ground is detected;
   a DC ground isolation state machine for isolating a grid box when a DC ground is detected;
   a dynamic braking grid failure isolation state machine for isolating a grid box when a change in resistance is detected;
   a dynamic braking grid failure early detection algorithm for determining a failure before using said state machines; and
   a traction motor ground isolation per axle torque limit system connected to said AC ground isolation state machine.

2. A system for isolating electrical ground faults and secondary failures in an off road vehicle propulsion system, said system comprising:
   an AC ground isolation state machine for isolating a traction motor or alternator when an AC ground is detected;
   a DC ground isolation state machine for isolating a grid box when a DC ground is detected;
   a dynamic braking grid failure isolation state machine for isolating a grid box when a change in resistance is detected;
   a dynamic braking grid failure early detection algorithm for determining a failure before using said state machines; and
   a supplemental voltage functions system providing voltage average rates and alternator rectifier bias state information to said state machines and said early detection algorithm.

3. The system of claim 1 wherein said dynamic braking grid failure early detection algorithm comprises a model of operation conditions which are compared to actual operation conditions to determine a failure in said propulsion system.

4. The system of claim 1 wherein said algorithm compares a modeled speed of a blower to an actual speed of said blower.

5. The system of claim 1 wherein the off road vehicle is at least one of a locomotive and an off highway vehicle.

6. The system of claim 2 wherein said dynamic braking grid failure early detection algorithm comprises a model of operation conditions which are compared to actual operation conditions to determine a failure in said propulsion system.

7. The system of claim 2 wherein said algorithm compares a modeled speed of a blower to an actual speed of said blower.

8. The system of claim 2 wherein the off road vehicle is at least one of a locomotive and an off highway vehicle.

* * * * *